(12) United States Patent
Beigel et al.

(10) Patent No.: US 7,648,185 B2
(45) Date of Patent: Jan. 19, 2010

(54) MIRROR MOUNTING WITH INTEGRAL RAIN GUTTER

(75) Inventors: David J. Beigel, Payne, OH (US); Travis E. Dennison, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 943 days.

(21) Appl. No.: 11/195,259

(22) Filed: Aug. 1, 2005

(65) Prior Publication Data

US 2007/0024073 A1    Feb. 1, 2007

(51) Int. Cl.
*B62D 33/06*    (2006.01)
(52) U.S. Cl. ...................................... 296/1.11
(58) Field of Classification Search ............... 296/1.11, 296/135, 152, 154; 248/466, 475.1, 479; D12/187
See application file for complete search history.

(56) References Cited

U.S. PATENT DOCUMENTS

| | | | | |
|---|---|---|---|---|
| 2,039,208 A | * | 4/1936 | Billman | 296/152 |
| D148,831 S | * | 2/1948 | Wagner | D12/190 |
| 2,635,918 A | * | 4/1953 | Muckle | 296/213 |
| 2,672,365 A | * | 3/1954 | Stanton | 296/154 |
| 2,799,529 A | * | 7/1957 | Groboski | 296/152 |
| 2,860,546 A | * | 11/1958 | Bolser | 248/477 |
| 4,830,326 A | * | 5/1989 | Schmidt et al. | 248/479 |
| 4,923,241 A | * | 5/1990 | Miller | 296/154 |
| 4,962,601 A | * | 10/1990 | Gold | 49/374 |
| 5,150,941 A | * | 9/1992 | Silzer et al. | 296/152 |
| 5,460,425 A | * | 10/1995 | Stephens | 296/152 |
| 5,899,520 A | * | 5/1999 | Bryant | 296/152 |
| D462,305 S | * | 9/2002 | Abalos et al. | D12/187 |

* cited by examiner

*Primary Examiner*—Glenn Dayoan
*Assistant Examiner*—Pinel E Romain
(74) *Attorney, Agent, or Firm*—Jeffrey P. Calfa; Mark C. Bach

(57) ABSTRACT

A mirror assembly (30) has a housing (32) that houses a mirrored reflecting surface (40) for enabling a person in a driver's compartment of a vehicle cab (10) to look through a side door window opening (20) and see a field of view toward the rear of the vehicle. The mirror assembly mounting (32) includes a mounting bar (42) that is attached to the side door, that has a length running along the top margin of the door, and that along at least a portion of that length comprises an upwardly open channel (50) for collecting rainwater runoff from the roof and carrying it rearward before the runoff can wash across the window opening.

15 Claims, 1 Drawing Sheet

MIRROR MOUNTING WITH INTEGRAL RAIN GUTTER

FIELD OF THE INVENTION

This invention relates to motor vehicles, especially large trucks that have large outside rearview mirrors attached to driver and passenger doors for enabling the driver of a truck to look through door openings at reflecting surfaces of the mirrors and see fields of view toward the rear of the truck along either side.

FIELD OF THE INVENTION

An outside rearview mirror assembly for a large highway truck typically comprises a housing, or shell, that is supported on a driver- or passenger-side door by a mounting that includes one or more struts extending outboard of the door. The housing often has a generally rectangular shape for supporting a generally rectangular mirror in a generally upright orientation at an angle to the door. If the mirror is immovable on the housing, then the housing is typically adjustable via the mounting to enable the mirror to be placed in a position desired by the driver. In some mirror assemblies, the mirror is itself adjustable within the housing.

The mounting includes some form of attachment means for attaching the strut or struts to the door. One attachment means is a mounting bar that is fastened to the door between the top edge of the door and the top edge of the door window opening. An end of a strut opposite the mirror housing is joined to the mounting bar, and fasteners attach the mounting bar to the door. The mounting may be strengthened by a diagonal brace extending between the mounting bar and the strut.

SUMMARY OF THE INVENTION

The inventors have observed that some large trucks may not have roof gutters, sometimes called drip rails, running along the door openings above the doors. Consequently, rainwater that runs off the sides of the roof over the doors cannot be collected and channeled away from the door windows. In a truck cab lacking such gutters, rainwater running off the sides of the roof washes down across the door windows, and with the door windows, unlike the windshield, lacking outside wipers, the rainwater reduces the clarity of the view through the door window glass. Moreover, if the glass is down leaving the door window open, some of the runoff rainwater can enter the cab interior. Runoff can be aggravated by the presence of an aerodynamic pod, or wind deflector, on the cab roof because the structure of such a device has a shape that tends to direct more rainwater down the sides of the cab.

The present invention relates to a novel outside rearview mirror that incorporates a rain gutter into a mounting bar of the mirror mounting. The inventive mounting bar is further distinguished from a known mounting bar that lacks such a rain gutter by a longer length that extends substantially the full width of the door window opening between the top of the opening and the top of the door.

The invention provides a cost-effective way to provide the advantages of roof rain gutters in a large truck without having to modify the roof itself. The known mounting bar is fabricated from a suitable plastic. The inventive mounting bar is also fabricated from plastic, and can have the same features for attachment of the strut or struts that support the mirror housing. The inventive housing differs in that it has an extended length, running rearward substantially to the rearmost point of the door window opening. Fasteners are still used for attaching the inventive mounting bar to the door.

One aspect of the invention relates to a motor vehicle cab comprising a roof, a side door that provides ingress to and egress from a driver's compartment inside the cab, a window opening in the door located below a margin of the door that is between the cab roof and the window opening, and an outside rearview mirror assembly.

The mirror assembly comprises a housing that houses a reflecting surface for enabling a person in the driver's compartment to look through the window opening and see a field of view toward the rear of the vehicle, and a mounting for mounting the housing on the door. The mounting comprises a mounting bar that is attached to the door, that has a length running along the top margin of the door, and that along at least a portion of that length comprises an upwardly open channel for collecting rainwater runoff from the roof before the runoff can wash across the window opening.

Another aspect relates to the mirror assembly itself.

A further aspect of the invention relates to a method for preventing rainwater runoff from the roof of a vehicle cab from washing across a window opening in a side door of the cab. The method comprises collecting the runoff rainwater in a gutter trough that runs along a margin of the door that is between the roof and the window opening and that is defined at least in part by a mounting bar of an outside rearview mirror assembly mounted on the door, and channeling the collected runoff water rearward and out of the gutter trough at a location that is rearward of at least most of the window opening.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
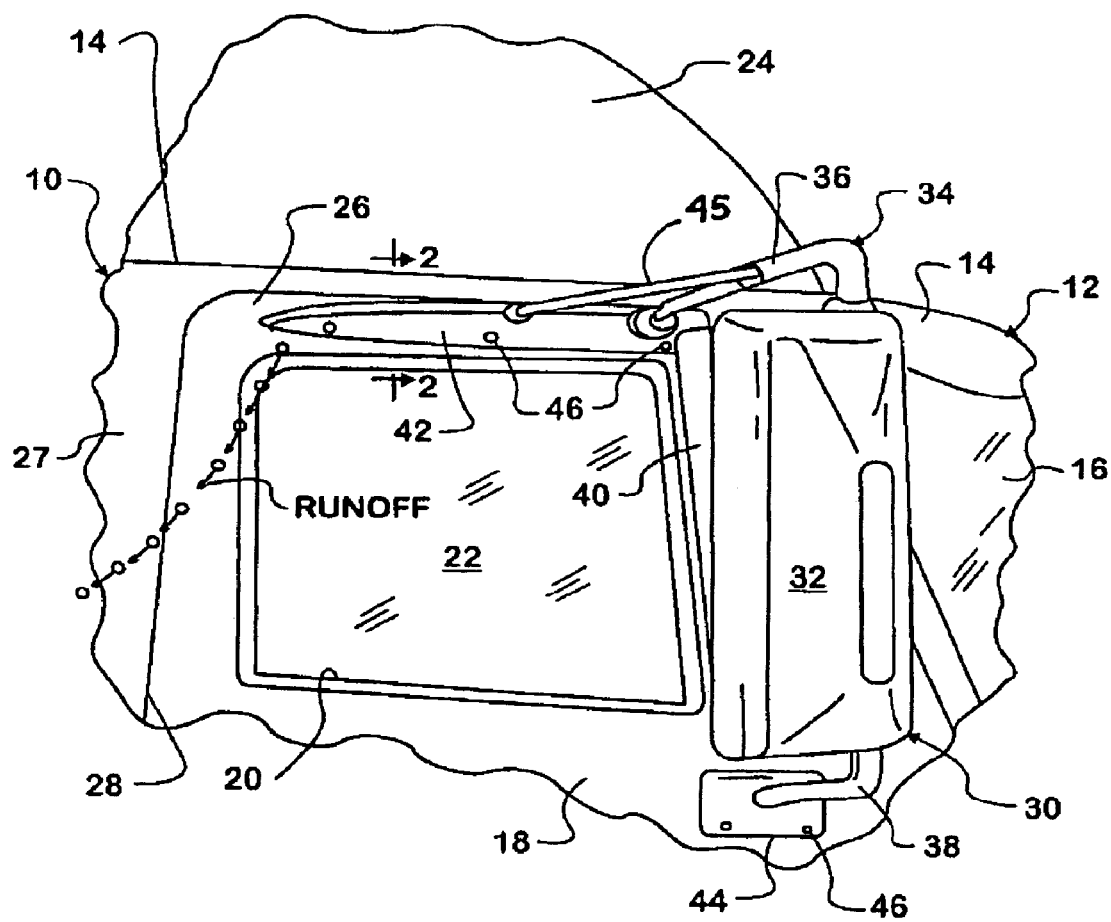
FIG. 1 is a side elevation view of a portion of a truck cab having a door-mounted rearview mirror assembly in accordance with principles of the present invention.
Figure 2:
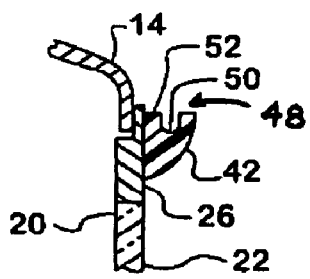
FIG. 2 is an enlarged transverse cross section view in the direction of arrow 2-2 in FIG. 1.

FIGS. 1 and 2 show a portion of a cab 10 of a highway truck 12 that is illustrative of principles of the present invention. The view is taken looking at the right (passenger) side of the cab.

Cab 10 comprises a roof 14, windshield 16, and a passenger side door 18. Door 18 has a window opening 20 that is generally rectangular in shape. A window glass 22 can be moved up and down within window opening 20 and is shown in its fully up position closing window opening 20. An aerodynamic pod, or wind deflector, 24 is shown atop roof 14 to aid in reducing aerodynamic drag when the truck is towing a trailer.

Window opening 20 is located in door 18 below a margin 26 of the door that is between roof 14 and the window opening. Roof 14 lacks any gutter along the side where it joins with a side panel 27 of cab 10 that contains a door opening 28 that is closed by door 18 when the door is shut.

An outside rearview mirror assembly 30 embodying principles of the invention is mounted on the outside of door 18. Mirror assembly 30 comprises a housing, or shell, 32 that is supported on door 18 by a mounting 34 that includes a strut 36 at the top and a strut 38 at the bottom. Housing 32 has a generally rectangular shape for supporting a generally rectangular mirror 40 in a generally upright orientation at an angle to door 18 and glass 22. The housing and/or the mirror are adjustable on the mounting to enable the mirrored surface of mirror 40 to be placed in a position desired by the driver for observing a rearward field of view along the passenger side of the truck.

Mounting 34 further includes a mounting bar 42 at an end of strut 36 opposite housing 32 and a mounting piece 44 at an end of strut 38 opposite housing 32. Bar 42 is disposed against door margin 26 and runs lengthwise along the width of door 18. The ends of the two struts opposite housing 32 are affixed to bar 42 and to piece 44 respectively in any suitable manner. The mounting may be strengthened by a diagonal brace 45 running between mounting bar 42 and strut 36 as shown. Bar 42 and piece 44 are fastened to door 18 by fasteners 46 that pass through holes in bar 42 and piece 44 at suitable locations and into the door. Bar 42 is fabricated from suitable synthetic material by any process, such as molding, appropriate for the particular synthetic material.

FIG. 2 shows bar 42 to have a feature that endows it with a rain gutter 48 for collecting rainwater runoff from roof 14, including runoff from pod 24. The feature is an upwardly open channel 50 that has a length running along at least a portion of the overall length of bar 42 and that serves to collect rainwater runoff from the roof and pod before the runoff can wash across window opening 20 and glass 22 if the latter is up. Channel 50 has a shape forming a gutter trough that is separated from the exterior surface of door margin 26 by an intervening wall 52 of the mounting bar that forms a side of the trough. The trough preferably has a lengthwise extent spanning a majority of the width of window opening 20 and extending sufficiently far toward the rear of door 18 for carrying runoff far enough to the rear that it doesn't wash across the window opening and/or glass in a way that interferes with the driver's view of mirror 40. The trough also preferably has a shape that slopes downward toward the rear of the door so that collected rainwater running off toward the rear will spill out of the trough beyond the rear of the window opening and glass.

Figure 3:
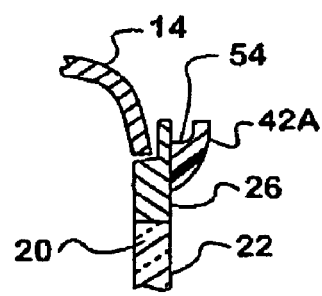
FIG. 3 is a view similar to FIG. 2 showing a another embodiment.

FIG. 3 shows a modified form of bar 42A to have a different arrangement for its upwardly open channel 54. Bar 42A lacks an intervening wall 52, and so not only is channel 54 upwardly open, it is also open toward the exterior surface of door margin 26. When attached to door 18, channel 54 cooperates with the exterior surface of the door margin so that channel 54 and that surface conjointly form the gutter trough for collecting rainwater runoff.

Like channel 50, channel 54 has a length running along at least a portion of the overall length of bar 42A that serves to collect rainwater runoff from the roof and pod before the runoff can wash across window opening 20 and/or glass 22. Channel 54 preferably has a lengthwise extent spanning a majority of the width of window opening 20 and extending sufficiently far toward the rear of door 18 for carrying runoff far enough to the rear that it doesn't wash across the window opening and/or glass in a way that interferes with the driver's view of mirror 40. The channel also preferably has a shape that slopes downward toward the rear of the door so that collected rainwater running off toward the rear will spill out of the trough beyond the rear of the window opening and glass.

It can be understood without detailed explanation that the driver's side door can be equipped in the same way with a mirror assembly that is symmetrically opposite the one that has been illustrated and described above. Moreover, principles of the invention can be applied to vehicles other than the highway truck that has been shown here as an example.

While a presently preferred embodiment of the invention has been illustrated and described, it should be appreciated that principles of the invention apply to all embodiments falling within the scope of the following claims.

What is claimed is:

1. A motor vehicle cab comprising:
   a roof;
   a side door that provides ingress to and egress from a driver's compartment inside the cab;
   a window opening in the door located below a margin of the door that is between the cab roof and the window opening; and
   an outside rearview mirror assembly comprising a housing that houses a reflecting surface for enabling a person in the driver's compartment to look through the window opening and see a field of view toward the rear of the vehicle, and a mounting for mounting the housing on the door, wherein the mounting comprises a mounting bar that is attached to the door, that has a length running along the top margin of the door, and that along at least a portion of that length comprises an upwardly open channel for collecting rainwater runoff from the roof before the runoff can wash across the window opening.

2. A vehicle cab as set forth in claim 1 wherein the upwardly open channel has a shape that cooperates with an exterior surface of the door margin so that the channel and that surface conjointly form a gutter trough for collecting rainwater runoff.

3. A vehicle cab as set forth in claim 2 wherein the gutter trough has a lengthwise extent spanning a majority of the width of the window opening.

4. A vehicle cab as set forth in claim 3 wherein the gutter trough has a shape that slopes downward toward the rear of the door for carrying collected rainwater runoff toward the rear of the door and out of the trough to prevent the runoff from washing a majority of the window opening.

5. A vehicle cab as set forth in claim 1 wherein the upwardly open channel has a shape forming a gutter trough that is separated from the door margin by an intervening wall of the mounting bar that forms a side of the gutter trough.

6. A vehicle cab as set forth in claim 5 wherein the gutter trough has a lengthwise extent spanning a majority of the width of the window opening.

7. A vehicle cab as set forth in claim 6 wherein the gutter trough has a shape that slopes downward toward the rear of the door for carrying collected rainwater runoff toward the rear of the door and out of the gutter trough to prevent the runoff from washing a majority of the window opening.

8. An outside rearview mirror assembly for mounting on a vehicle cab side door that has a window opening located below a margin of the door that is between a roof of the cab and the window opening, the mirror assembly comprising:
   a housing that houses a reflecting surface for enabling a person inside the cab to look through the window opening and see a field of view toward the rear of the vehicle, and a mounting for mounting the housing on the door wherein the mounting comprises a mounting bar for attachment to the margin of the door between the cab roof and the window opening, and along at least a portion of its length the mounting bar comprises an upwardly open channel for collecting rainwater runoff from the roof before the runoff can wash across the window opening.

9. An outside rearview mirror assembly as set forth in claim 8 wherein the upwardly open channel has a transverse shape that is also open toward a confronting exterior surface of the door margin so that when the mounting bar is attached to the door, the channel cooperates with the confronting exterior surface of the door margin so that the two conjointly form a gutter trough for collecting rainwater runoff from the roof.

10. An outside rearview mirror assembly as set forth in claim 9 wherein the gutter trough has a lengthwise extent spanning a majority of the width of the window opening.

11. An outside rearview mirror assembly as set forth in claim 10 wherein the gutter trough has a shape that slopes downward toward the rear of the door for carrying collected rainwater runoff toward the rear of the door and out of the gutter trough to prevent the runoff from washing a majority of the window opening.

12. An outside rearview mirror assembly as set forth in claim 8 wherein the upwardly open channel has a transverse shape forming a gutter trough that is separated from the door margin by an intervening wall of the mounting bar that forms a side of the gutter trough.

13. An outside rearview mirror assembly as set forth in claim 12 wherein the gutter trough has a lengthwise extent spanning a majority of the width of the window opening.

14. An outside rearview mirror assembly as set forth in claim 13 wherein the gutter trough has a shape that slopes downward toward a rearward end of the mounting bar for carrying collected rainwater runoff toward the rear of the door and out of the gutter trough at the rearward end of the mounting bar.

15. A method for preventing rainwater runoff from the roof of a vehicle cab from washing across a window opening in a side door of the cab, the method comprising:

collecting the runoff rainwater in a gutter trough that runs along a margin of the door that is between the roof and the window opening and that is defined at least in part by a mounting bar of an outside rearview mirror assembly mounted on the door, and channeling the collected runoff water rearward and out of the gutter trough at a location that is rearward of at least most of the window opening.

* * * * *